US007377428B2

(12) United States Patent
Takaki et al.

(10) Patent No.: US 7,377,428 B2
(45) Date of Patent: May 27, 2008

(54) COMMUNICATION TERMINAL AND INFORMATION COMMUNICATION SYSTEM

(75) Inventors: Taku Takaki, Fujisawa (JP); Makoto Katagishi, Chigasaki (JP); Osamu Hasegawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 11/185,790

(22) Filed: Jul. 21, 2005

(65) Prior Publication Data

US 2005/0252964 A1 Nov. 17, 2005

Related U.S. Application Data

(63) Continuation of application No. 10/438,337, filed on May 15, 2003, now abandoned.

(30) Foreign Application Priority Data

Nov. 29, 2002 (JP) ............................ 2002-346774

(51) Int. Cl.
*G07B 15/02* (2006.01)
*G06K 5/00* (2006.01)

(52) U.S. Cl. ...................................... 235/384; 235/380

(58) Field of Classification Search ........ 235/380–382, 235/384, 492; 705/13, 41, 44
See application file for complete search history.

(56) References Cited

U.S. PATENT DOCUMENTS 5,831,547 A 11/1998 Ohtsuko et al.
5,991,749 A 11/1999 Morrill, Jr.
5,995,018 A 11/1999 Hane et al.
6,473,790 B1 * 10/2002 Tagi ........................... 709/216
6,661,352 B2 12/2003 Tiernay et al.
6,744,369 B2 6/2004 Sata
6,809,631 B2 10/2004 Doi et al.
2002/0010603 A1 1/2002 Doi et al.
2002/0042729 A1 4/2002 Yajima et al.
2002/0082002 A1 6/2002 Fujii

FOREIGN PATENT DOCUMENTS

JP 08-018523 1/1996
JP 11-016011 1/1999
JP 11-328451 11/1999

(Continued)

OTHER PUBLICATIONS

Japanese Office Action issued in corresponding Japanese Patent Application No. JP 2002-346774 dated Mar. 13, 2007.

*Primary Examiner*—Steven S. Paik
*Assistant Examiner*—April A Taylor
(74) *Attorney, Agent, or Firm*—McDermott Will & Emery LLP

(57) ABSTRACT

A communication terminal for connecting or mounting an IC card or the like to examine a ticket through a non-contact communication. The communication terminal includes a function for receiving information stored in the IC card or the like in the ticket examination process and controlling itself automatically. The communication terminal can automatically display the validity of a pass and/or the balance of a prepaid sum in a ticket. Also, the communication terminal can register a specific station so that an email in a pre-registered format is created or sent automatically in the ticket examination process at the registered station.

10 Claims, 17 Drawing Sheets

FOREIGN PATENT DOCUMENTS

| | | |
|---|---|---|
| JP | 2000-020767 | 1/2000 |
| JP | 2002-063182 | 2/2002 |
| JP | 2002-083322 | 3/2002 |
| JP | 2002-279368 | 9/2002 |
| JP | 2002-351129 | 12/2002 |

* cited by examiner

COMMUNICATION TERMINAL AND INFORMATION COMMUNICATION SYSTEM

This application is a continuation of U.S. application Ser. No. 10/438,337 filed on May 15, 2003 now abandoned.

BACKGROUND OF THE INVENTION

The present invention relates to communication terminals such as portable phones and PDA devices for sending/receiving information. Such a communication terminal, which connects or mounts an IC card to be subjected to a ticket examination process through a non-contact communication, is disclosed in the official gazette of JP-A No.83322/2002.

The communication terminal disclosed in the above official gazette is capable of displaying gate passing records, as well as the balance of the prepaid sum stored in the IC card on the display unit when it functions as a prepaid card. This communication terminal also makes it possible for the user to update his/her pass and increase the sum in the prepaid card. To check such information as balance data, however, the user is requested to select one of the menus displayed in a hierarchical structure by pressing the keys of the terminal several times. Therefore, the user cannot avoid such a troublesome operation to check the balance of the prepaid card when the user wants to check the balance quickly, for example, just after passing a ticket examination gate.

SUMMARY OF THE INVENTION

Under such circumstances, it is an object of the present invention to provide a communication terminal easy to use and an information communication system that uses the communication terminal.

In order to achieve the above objects, the communication terminal of the present invention includes a first communication unit for communicating with an object through a network, a second communication unit capable of communicating with a communication device to receive data therefrom, storage for storing communication device information related to the communication device and destination information for denoting a destination to which information is to be sent so that both information items correspond to each other, and a control unit for controlling so that information that includes at least part of the data received from the communication device is sent through the first communication unit.

In another aspect, the communication terminal includes a communication unit capable of receiving data through communication with a communication device, storage for storing data received from the communication unit, and a display unit. When a decision unit for deciding whether or not communication has been done between the communication device and the communication unit decides that the communication is made or receives information for denoting that the communication unit has communicated with the communication device, the display unit displays data that includes at least part of the data received from the communication device.

DETAILED DESCRIPTION OF THE INVENTION

Hereunder, an embodiment of the present invention will be described with reference to the accompanying drawings.

Figure 1:
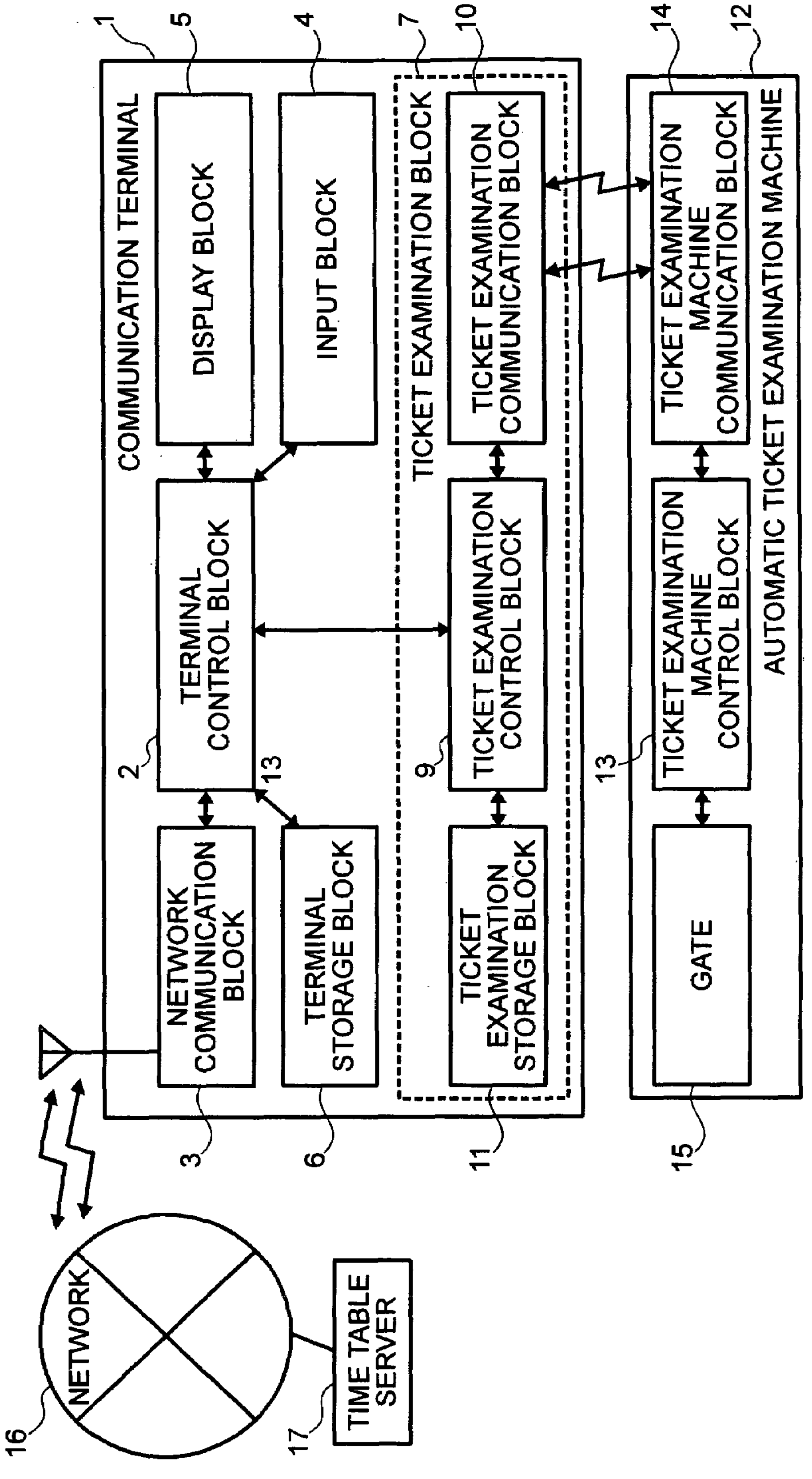
FIG. 1 is a block diagram of an information communication system in an embodiment of the present invention.

FIG. 1 shows an embodiment of the present invention, which is an information communication system used at a railway station. A communication terminal 1 is, for example, a portable telephone or PDA (Personal Digital Assistance) device. A terminal control unit 2 controls the function of each unit of the communication terminal 1. A network communication unit 3 is controlled by the terminal control unit 2 to make wireless communicates with a network 16. An input unit 4 is, for example, a key pad or the like to be used by the user to input information to the terminal control unit 2. A display unit 5 is, for example, a liquid crystal display controlled by the terminal control unit 2 to display character information, image information, etc. A terminal storage 6 is, for example, a RAM or the like used to store various types of information to be used by the terminal control unit 2.

A ticket examination unit 7 is used as a non-contact ticket or the like in an automatic ticket examination system that examines tickets by means of non-contact communication. The ticket examination unit 7 is configured by a ticket examination control unit 9 for controlling each unit of unit 7, a non-contact communication unit 10 for making non-contact communication with an automatic ticket examination machine 12, and a ticket examination storage 11 for storing tickets and information of other items related to ticket examination. The tickets and the information of other items stored in the ticket examination storage 11 is, for example, a sum of money information such as the balance of a prepaid card, as well as pass information.

The above description is just an example of the embodiment of the present invention. It does not limit the scope of the present invention. For example, the ticket examination unit 7 may be connected to the communication terminal 1 removably. In this connection, an interface unit is required to enable the communication between the communication terminal 1 and the ticket examination unit 7. If the ticket examination unit 7 is separated from the communication terminal 1 such way, there is no need to move such ticket examination information as those of a pass and/or prepaid card even when the communication terminal 1 is replaced with a newly bought one or when a plurality of communication terminals are used. It is just required to connect the new terminal/a plurality of communication terminals to another communication terminal to continue the use of the communication terminal 1. The ticket examination control unit 9 and the ticket examination storage 11 may be included in the terminal control unit 2 and the terminal storage 6 as part of them respectively.

Figure 2:
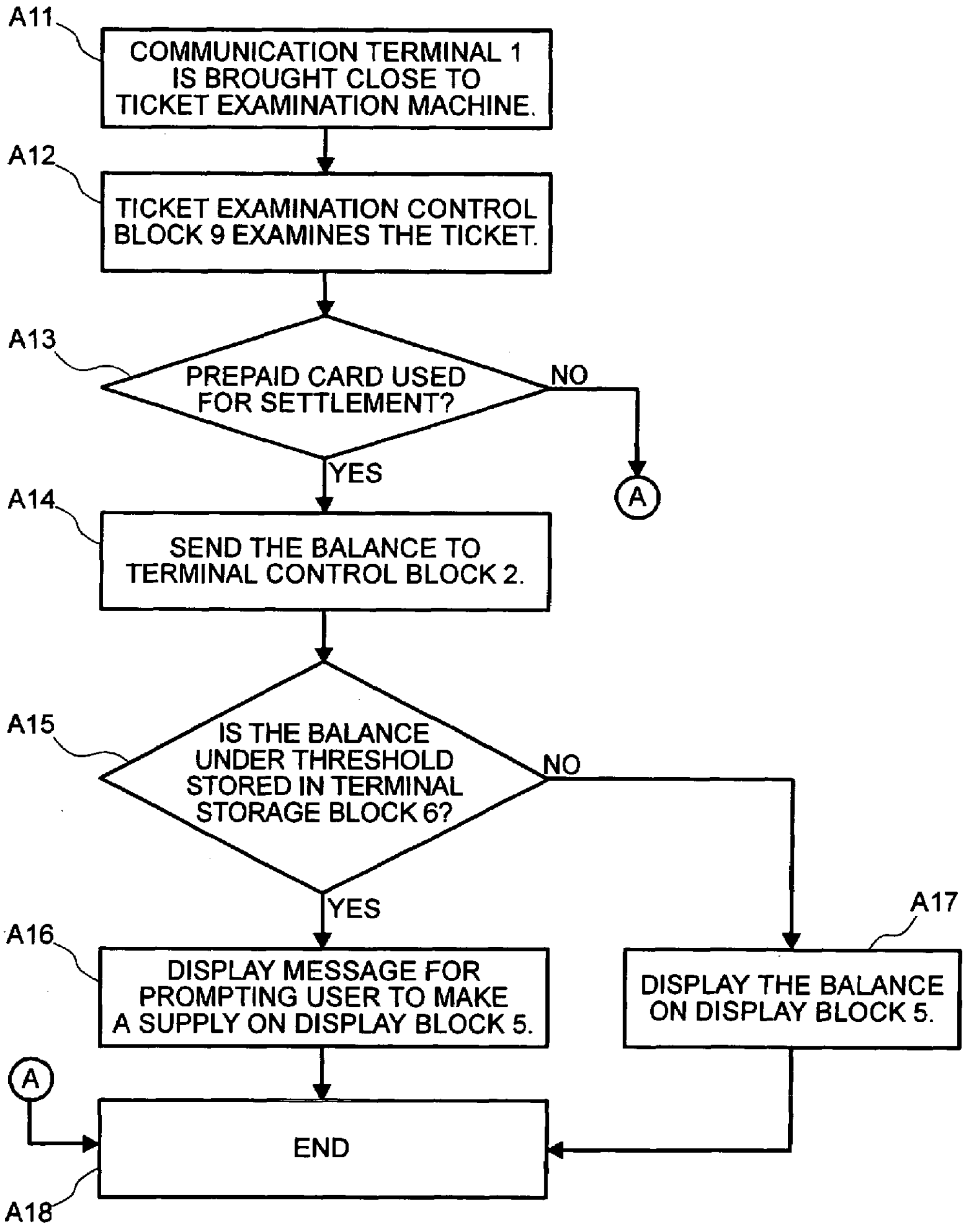
FIG. 2 is a flowchart of processing steps of a communication terminal.

Next, a description will be made for an embodiment for displaying data obtained after a ticket examination on the display unit 5 of the communication terminal 1 automatically. FIG. 2 shows an operation for displaying information related to the balance of a prepaid sum.

In this case, the user inputs a given sum of money to the terminal storage 6 by operating the keys of the communication terminal or store a threshold value of a prepaid sum of money beforehand by selecting one of the plurality of displayed menus. When the user brings the communication terminal 1 close to the automatic ticket examination machine 12 (step A11), the automatic ticket examination machine 12 begins the ticket examination. At this time, the ticket examination control unit 9 performs a normal ticket examination (step A12). If the ticket examination consumes some of the prepaid sum (step A13-Yes), the balance of the sum stored in the ticket examination storage 11 is sent to the terminal control unit 2 together with the station name and the consumed price (step A14).

Figure 3:
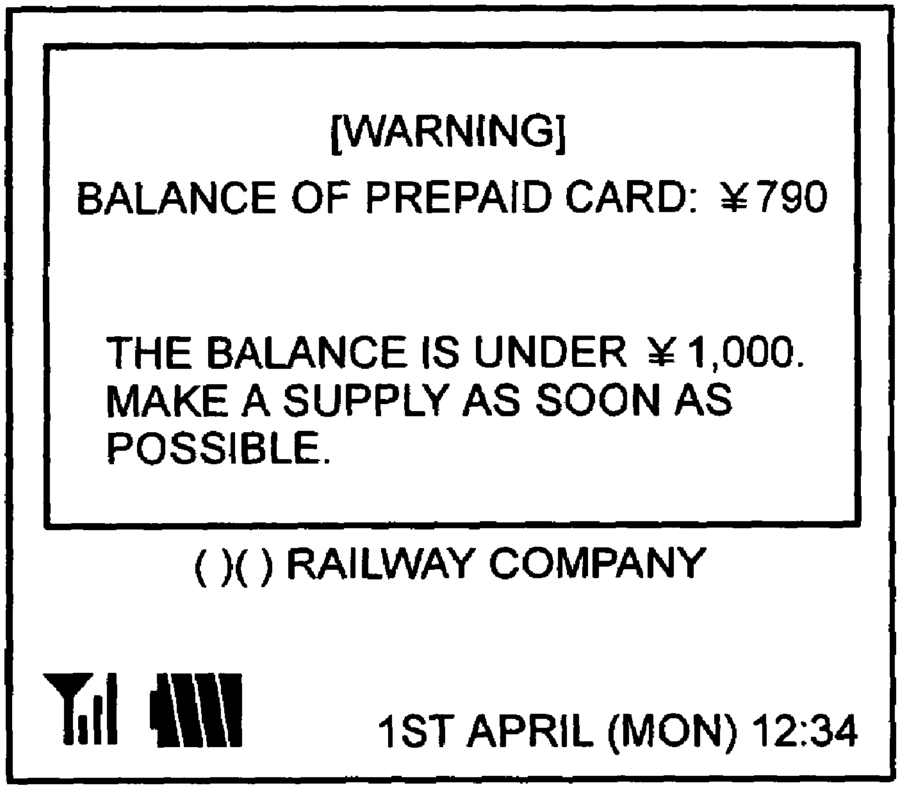
FIG. 3 is an example of displaying a message for prompting the user to increase the prepaid sum.

The terminal control unit 2 then compares the received balance of the prepaid sum with the threshold value of the prepaid sum stored in the terminal storage 6 (step A15). If the received balance is under the threshold value (step A15-Yes), the terminal control unit 2 displays a message for prompting the user to increase the prepaid sum on the display unit 5 in a format, for example, as shown in FIG. 3 (step A16), then terminates the processing (step A18).

Figure 4:
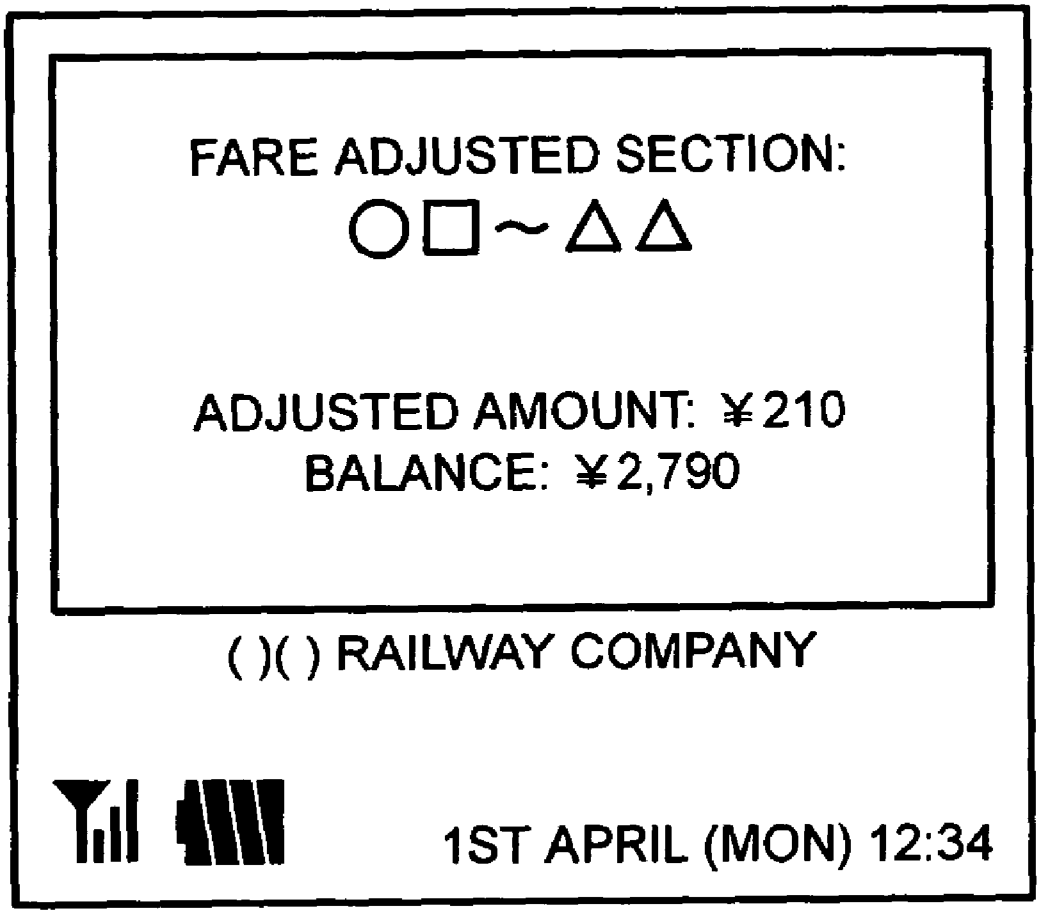
FIG. 4 is an example of displaying a balance of a prepaid card.

On the other hand, if the received balance is over the threshold value (step A15-No), the terminal control unit displays the received balance of the prepaid sum on the display unit 5 in a format, for example, as shown in FIG. 4 (step A17), then terminates the processing (step A18). When the prepaid sum is not reduced at all in the ticket examination (step A13-No), the processing is terminated (step A18).

According to this embodiment, therefore, it is possible to display the balance of each prepaid sum and/or messages on the display screen of the communication terminal 1 automatically without requesting the user for any key operation after the user passes a ticket examination gate. The balance of such a prepaid sum and other information can thus be confirmed even in a hurry.

The steps A15 and A16 may be omitted. In this connection, the step A17 comes after the step A14, so that only the balance is displayed as shown in FIG. 4. FIGS. 3 and 4 are just examples of display format. They do not limit the display contents. For example, it is possible to add a prepaid sum adjustment section and an adjustment fare to the display shown in FIG. 3.

The threshold value is not limited only to that inputted according to the user's key operation. It may be preset in the terminal. In this connection, the troublesome user's setting is omissible.

Figure 5:
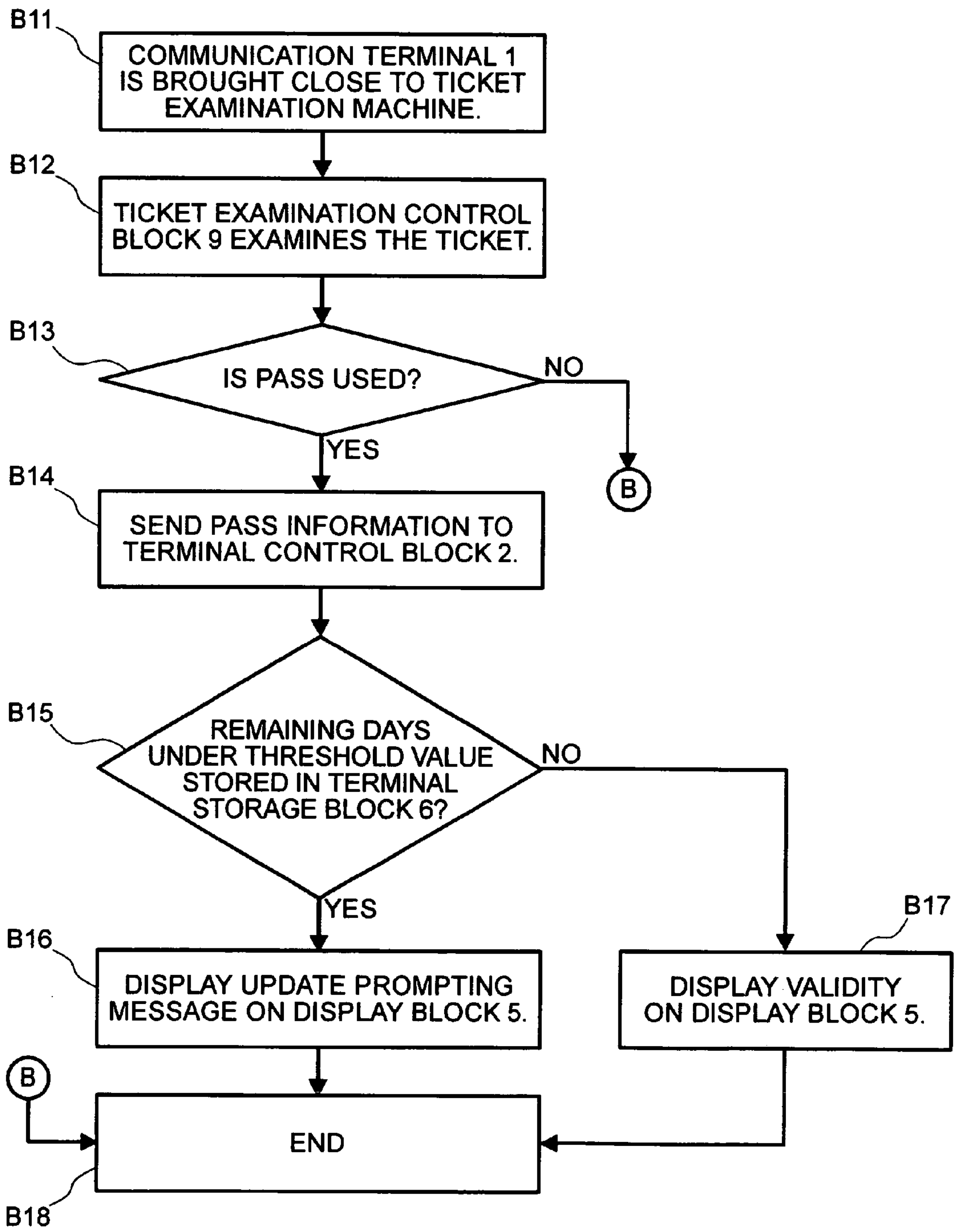
FIG. 5 is another flowchart of processing steps of a communication terminal.
Figure 6:
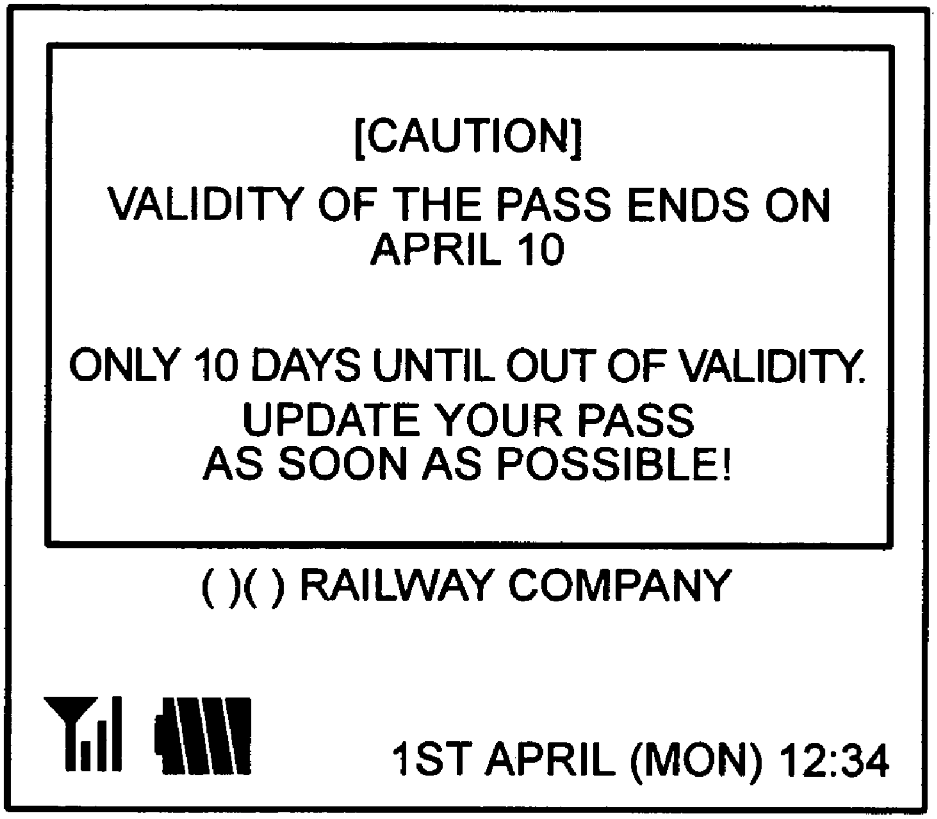
FIG. 6 is an example of displaying a message for prompting the user to update his/her pass.
Figure 7:
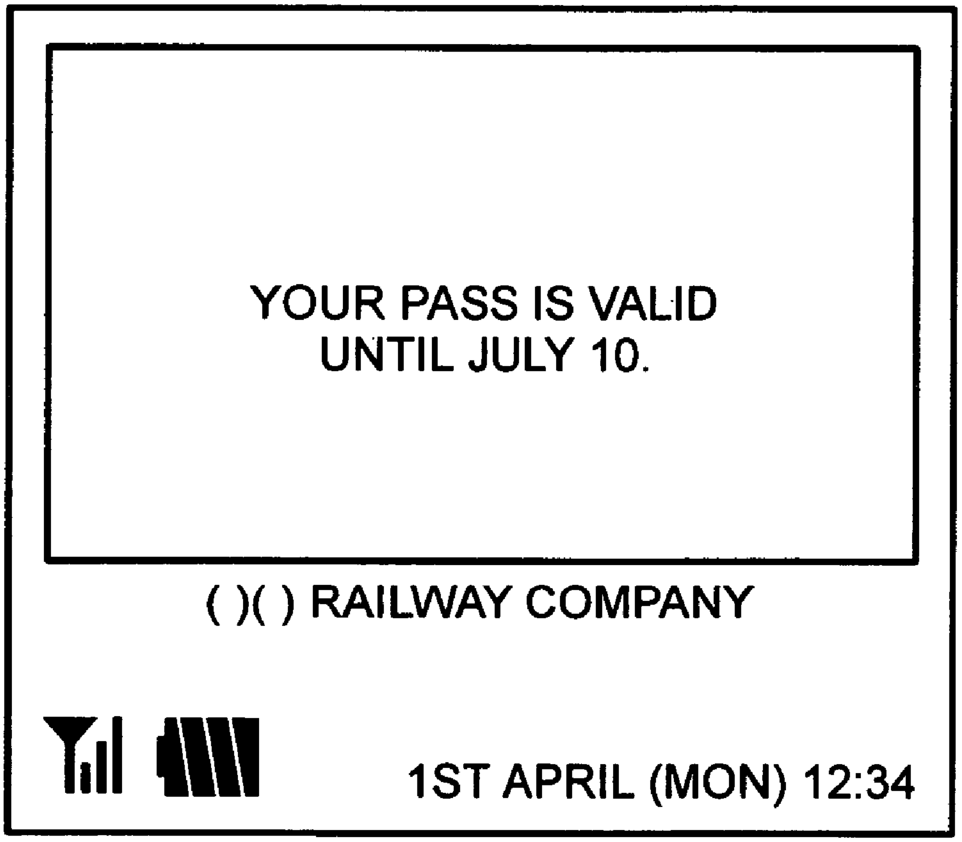
FIG. 7 is an example of displaying the validity of a pass.
Figure 8:
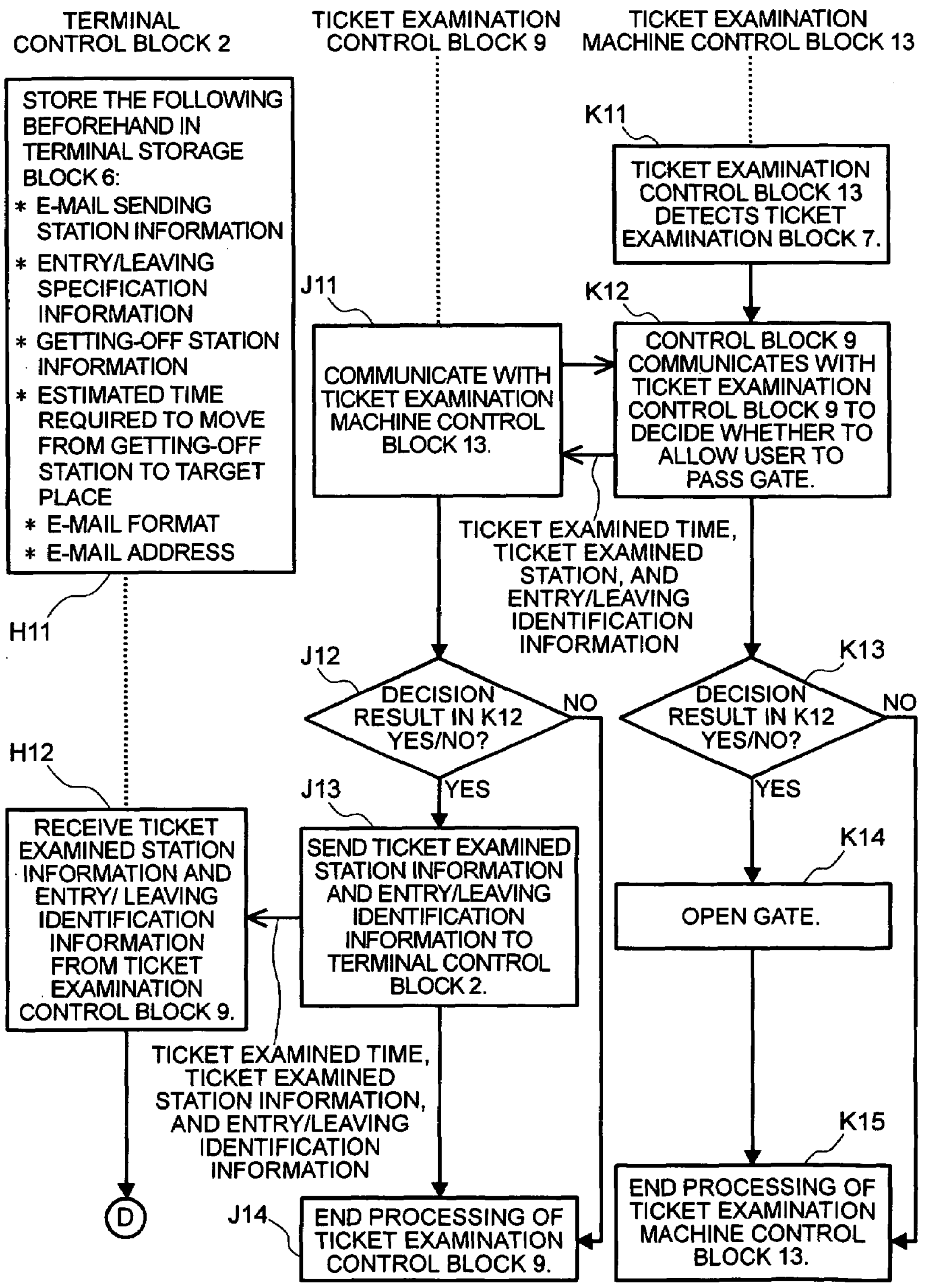
FIG. 8 is a chart for describing processing steps for sending an e-mail automatically at a station.
Figure 9:
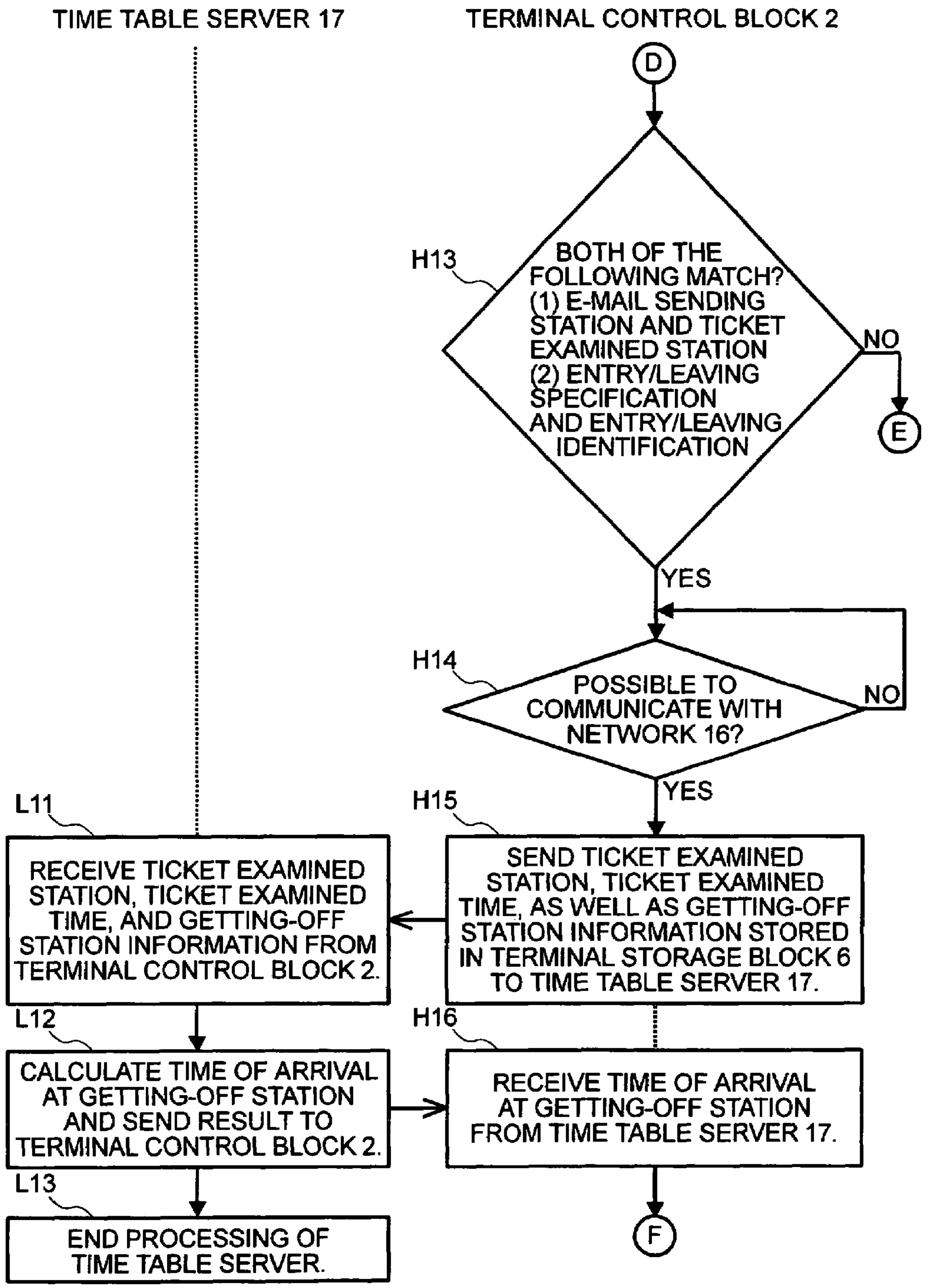
FIG. 9 is another chart for describing processing steps for sending an e-mail automatically at a station.
Figure 10:
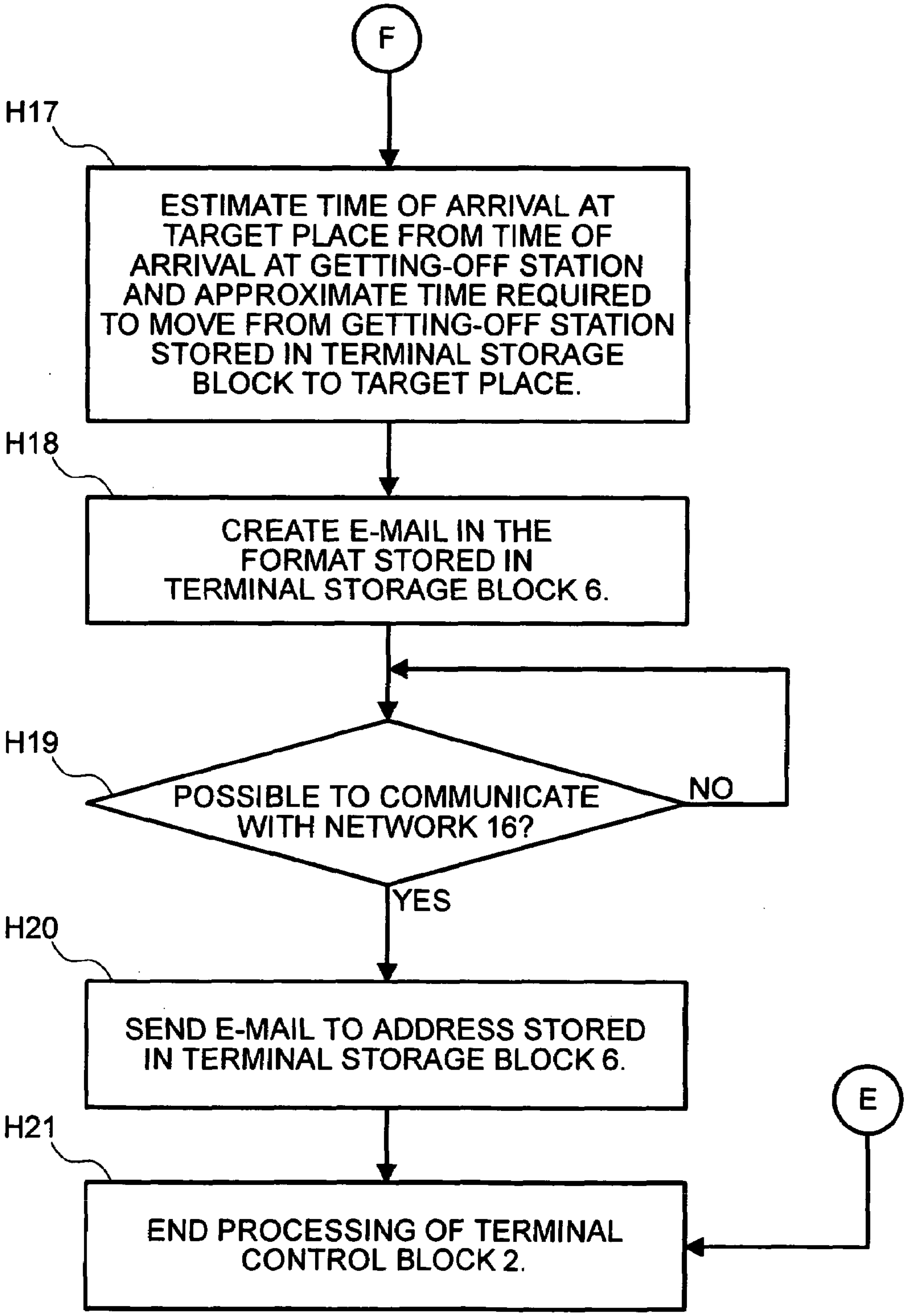
FIG. 10 is still another chart for describing processing steps for sending an e-mail automatically at a station.

The communication device may also be used to display a validity term of the user's pass as shown in FIG. 5 in addition to the balance of a prepaid sum. In this connection, the terminal storage 6 comes to store a preset threshold value for the number of remaining dates of the pass inputted by the user with the terminal keys. If the number of remaining dates is under the threshold value (step B15-Yes), the terminal control unit 2 displays a message for prompting the user to update the pass on the display unit 5 in a format, for example, as shown in FIG. 6 (step B16). If the number of remaining dates is over the threshold value (step B15-No), the terminal control unit 2 displays the validity of the pass on the display unit 5 as shown in FIG. 7 (step B17). According to this embodiment, therefore, the user can confirm the validity of his/her pass and prevent forgetting of the updating even when the ticket examination gate is congested, so that there is no time to confirm the validity on the screen of the ticket examination machine.

The information communication system of the present invention is not limited only for the use at stations. It may be used at gates of amusement parks, highways, etc., so as to display the consumed sum, the obtained points, the balance, the use frequency record, and the validity of the user's communication terminal each time the user passes a gate. For an electronic account settlement at a shop, the payment and the integrated points may be displayed automatically on the screen of the terminal.

According to the embodiments described above, therefore, it is possible to prompt the user to take notice of the validity of his/her pass and/or balance of the prepaid sum that are close to the threshold values by displaying them on the screen of the communication terminal when the user passes a ticket examination gate and/or makes an electronic account settlement. Consequently, the user is prevented from forgetting out-of-the-validity and insufficient balance of the prepaid sum. In addition, because information is displayed on the screen of the communication terminal, the user can confirm information related to the balance of the prepaid sum, etc. later on the screen leisurely when the ticket examination gate/cashier is busy.

Next, a description will be made for an embodiment for sending an e-mail to a specified address automatically after a ticket examination at a specified station with reference to FIG. 1 and FIGS. 8 through 10.

In this embodiment, the communication terminal 1 is provided with an e-mail sending function for sending e-mails through the network communication unit 3 and the network 16. The network 16 through which the communication terminal 1 makes communication includes a time table searching server 17, which outputs an arrival time of a train at a target getting-off station according to an input of the entraining station name, the entraining time, and the getting-off station name.

In this connection, the user is requested to store the following information items in the terminal storage 6 beforehand (step H11): information of a station from which an e-mail is to be sent automatically, information for specifying either of entry time or leaving time on which the e-mail is to be sent, information for enabling a getting-off station to be identified, an approximate time required to move from the getting-off station to a target station, a format of the e-mail to be sent, and an address to which the e-mail is to be sent. The e-mail format includes blank fields for describing an entraining station name, an e-mail sending time, a target place name, and an estimated arrival time at the target place.

When the user brings the communication terminal close to the automatic ticket examination machine 12, the control unit 13 of the ticket examination machine 12 detects the ticket examination unit 7 (step K11). The ticket examination control unit 9 and the ticket examination machine control unit 13 communicate with each other through the ticket examination communication unit 10 and the ticket examination machine communication unit 14 while the ticket examination machine control unit 13 decides whether to pass the user through the gate (Yes/No)(steps J11 and J12). If the decision result is "Yes" (step K13-Yes), the ticket examination machine control unit 13 opens the gate (step K14) and terminates the processing (step K15). If the decision result is "No" (step K13-No), the ticket examination machine control unit 13 terminates the processing (step K15) immediately.

The data received by the ticket examination control unit 9 from the ticket examination machine control unit 13 in steps J11 and K12 includes ticket examined time information for enabling a ticket examined time to be identified, ticket examined station information for enabling a ticket examined station to be identified, entrance/leaving identification information for distinguishing between entry and leaving, and the gate passing decision result decided in step K12. If the received gate passing decision result is "Yes" (step J12-Yes), the ticket examined station information and the entrance/leaving identification information are sent to the terminal control unit 2 through the interface unit 8 (step J13), then the ticket examination control unit 9 terminates the processing (step J14). If the gate passing decision result received in step F11 is "No" (step J12-No), the ticket examination control unit 9 terminates the processing immediately (step J14).

The terminal control unit 2, when receiving ticket examined station information and entry/leaving information from the ticket examination control unit 9 (step H12), compares the received ticket examined station information with the e-mail sending station information (1) stored in the terminal storage 6, as well as the received entry/leaving identification information with the entry/leaving specification information (2) (step H113).

If both are identical in contents (step H13-Yes) and communication with the network 16 is allowed (step H14-Yes), the terminal control unit 2 sends the information of the ticket examined time and the ticket examined station received from the ticket examination control unit 9 in step H12, as well as the getting-off station stored in the terminal storage 6 to the time table searching server 17 (step H15). If the communication with the network 12 is not allowed in step H14 (step H14-No), the terminal control unit 2 waits until the communication is allowed, then goes to step H15.

The time table server 17, when receiving the information of the ticket examined station, the ticket examined time, and the getting-off station from the terminal control unit 2 (step L11), calculates the arrival time at the getting-off station and sends the result to the terminal control unit 2 (step L12), then terminates the processing (step L13).

The terminal control unit 2, when receiving the arrival time at the getting-off station from the time table server 17 (step H16), estimates the arrival time at the target place stored in the terminal storage 6 according to the received arrival time at the getting-off station and the estimated time required to reach the target place from the getting-off station (step H17) to fill the blank fields of the entraining station name, the mail sending time, the target place name, and the estimated arrival time at the target place in the e-mail format stored in the terminal storage 6 to create an e-mail (step H 18). After that, if the terminal control unit 2 is allowed to communicate with a network through the network communication unit 3 (step H19-Yes), the terminal control unit 2 sends the e-mail created in step H18 to the e-mail address stored in the terminal storage 6 (step H20), then terminates the processing (step H21).

If the terminal control unit 2 is not allowed to communicate with the network in step H19 (step H19-No), the terminal control unit 2 waits until the communication is allowed, then sends an e-mail to the network and terminates the processing. If either of (1) and (2) is decided not to be identical in step H13 (step H13-No), the terminal control unit 2 terminates the processing (step H21).

According to this embodiment, therefore, it is possible to send an e-mail automatically after the user passes the ticket examination gate without requesting the user to make any key operation. For example, if the user's home is set as the e-mail address, the e-mail sending station is set at the nearest station to the screen or company, and the entry/leaving specification information is set at the entry time, the user is allowed to communicate with his/her family about his/her returning home without fail automatically. The user is not requested to do any operation at this time. In addition, because an estimated arrival time is included in the e-mail such way, it is easy for the mail receiver to know the homecoming time of the mail sender.

It is also possible to display the mail contents, address, and message for sending the e-mail on the communication terminal screen at this time so that the user's confirmation is confirmed before the e-mail is sent. Consequently, it is prevented that e-mails are sent regardless of the user's will.

Figure 11:
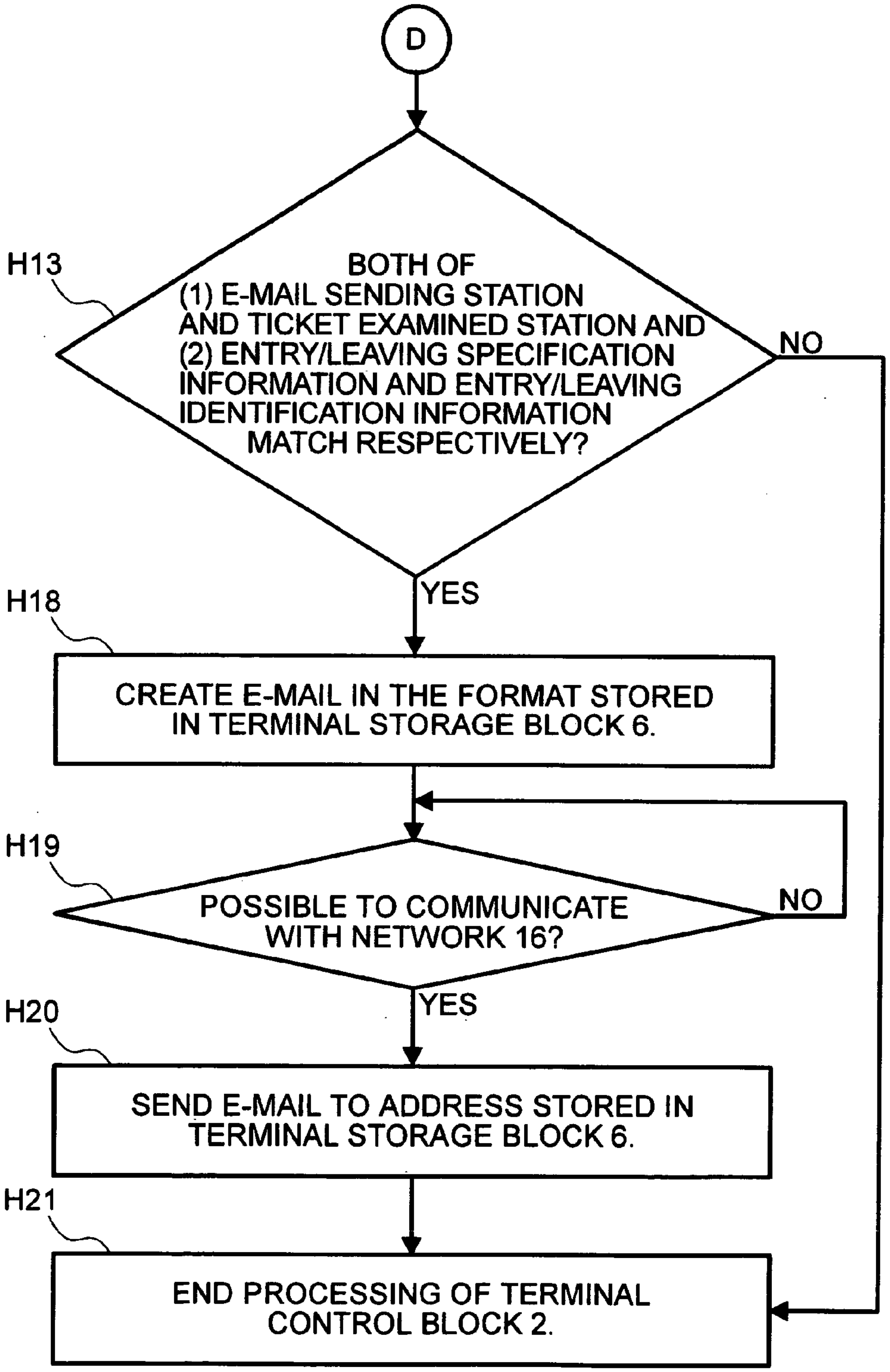
FIG. 11 is still another chart for describing processing steps for sending an e-mail automatically at a station.

It is also possible to send the e-mail that includes the ticket examined station and the ticket examined time just like the step shown in FIG. 11. Because the communication with the time table server is omissible, the communication fee can be saved. It is also possible to download the time table data from the time table server 17 to the communication terminal 1 periodically so that the arrival time is estimated at the communication terminal 1.

Next, a description will be made for an embodiment for creating an e-mail that includes information related to an institution automatically at the communication terminal 1 so that the e-mail is sent to the institution gate when the user enters the institution.

Figure 12:
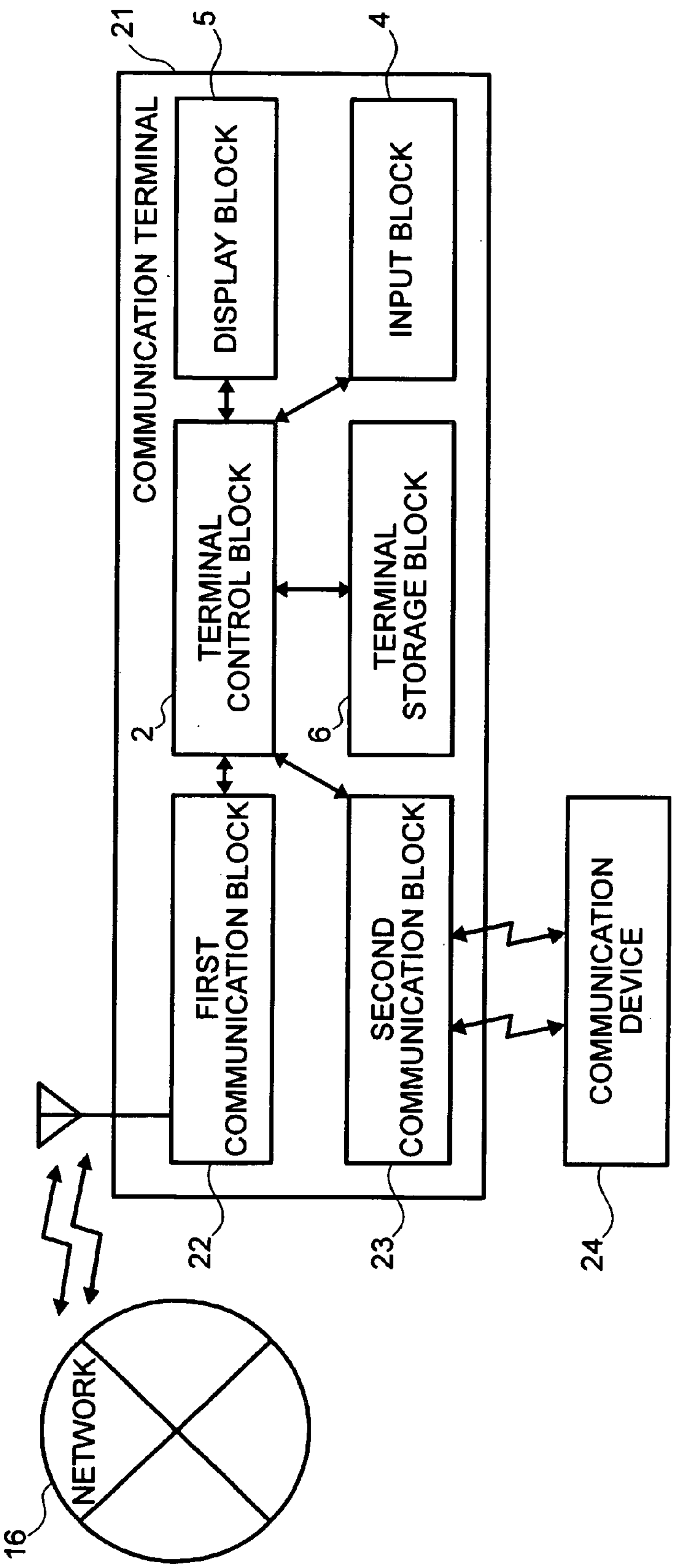
FIG. 12 is a block diagram of an information communication system in an embodiment of the present invention.

FIG. 12 shows an embodiment of an information communication system. In FIG. 12, the same reference numerals are used for the same components as those shown in FIG. 1, avoiding redundant description. A communication terminal 21 in this embodiment includes a first communication unit 22 for making wireless communication with a network 16, for example, through a telephone line and a second communication unit 23 used for Bluetooth (trademark) communication, non-contact IC card communication, or the like. The second communication unit 23 communicates with a communication device 24 attached at, for example, an entry/leaving gate.

The above configuration is just an example. It does not limit the scope of the present invention. For example, each of the second communication unit, the control unit, and the storage may be provided independently in a communication terminal just like the ticket examination unit shown in FIG. 1. Each of those independent components may be connected to the communication terminal 21 removably.

In this embodiment, it is assumed that the communication device 24 is installed, for example, at an amusement park. This amusement park is assumed to have a mascot character and an original song thereof.

At first, a description will be made for various types of setting for creating and sending e-mails automatically. Admission tickets are issued electronically and the information of each purchased admission ticket is stored in the terminal storage 6 of the communication terminal 21. The communication terminal 21 obtains an e-mail format from the first communication unit 22 or second communication unit 23 when the user purchases an admission ticket or passes an entry gate. The e-mail format may be stored in the terminal storage 6. This e-mail format is assumed to include the name and the picture data of the amusement park, as well as the control code for inserting voice data to be heard as the BGM of the amusement park in the corresponding field of the format. Different control codes are used for different types of such information to be inserted. The terminal control unit 2 inserts obtained information (to be described later) in the field of the corresponding control code. The user is allowed to edit any field except for those of the control codes freely.

The e-mail format is not limited only to that obtained from the first communication unit 22 or second communication unit 23. It may be a regular one preset in the terminal storage 6 or created newly by the user.

User inputted addresses are stored beforehand in the terminal storage 6 so as to enable e-mails to be sent automatically without user's specification. However, address input by the user is not always needed when any of created e-mails is not sent automatically and to be retained in the communication terminal 21. It is also possible for the user to decide whether to create and send e-mails automatically and store the decision in the terminal storage 6. Because the user can decide necessary items as needed such way, the user comes to be able to use the communication terminal 21 more easily. The terminal control unit 2 is also allowed to set some of those decisions automatically. For example, it is possible to set "Yes" for whether to create an e-mail automatically when an e-mail format is downloaded and "Yes" for whether to send an e-mail automatically when the user inputs an e-mail address. This makes it possible for the user to save his/her labor for making those decisions.

Figure 13:
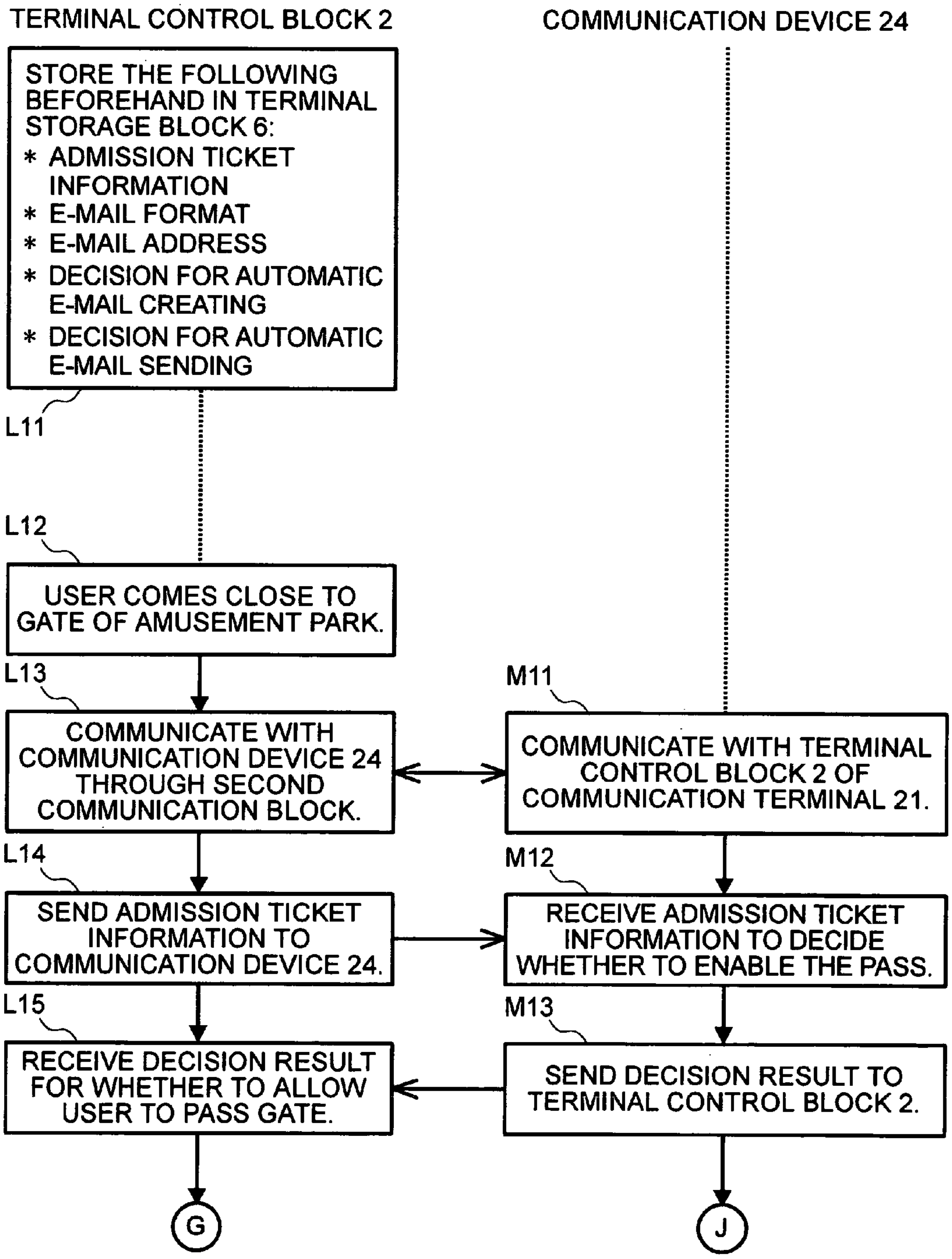
FIG. 13 is a chart for describing processing steps for sending an e-mail automatically at an amusement park.
Figure 14:
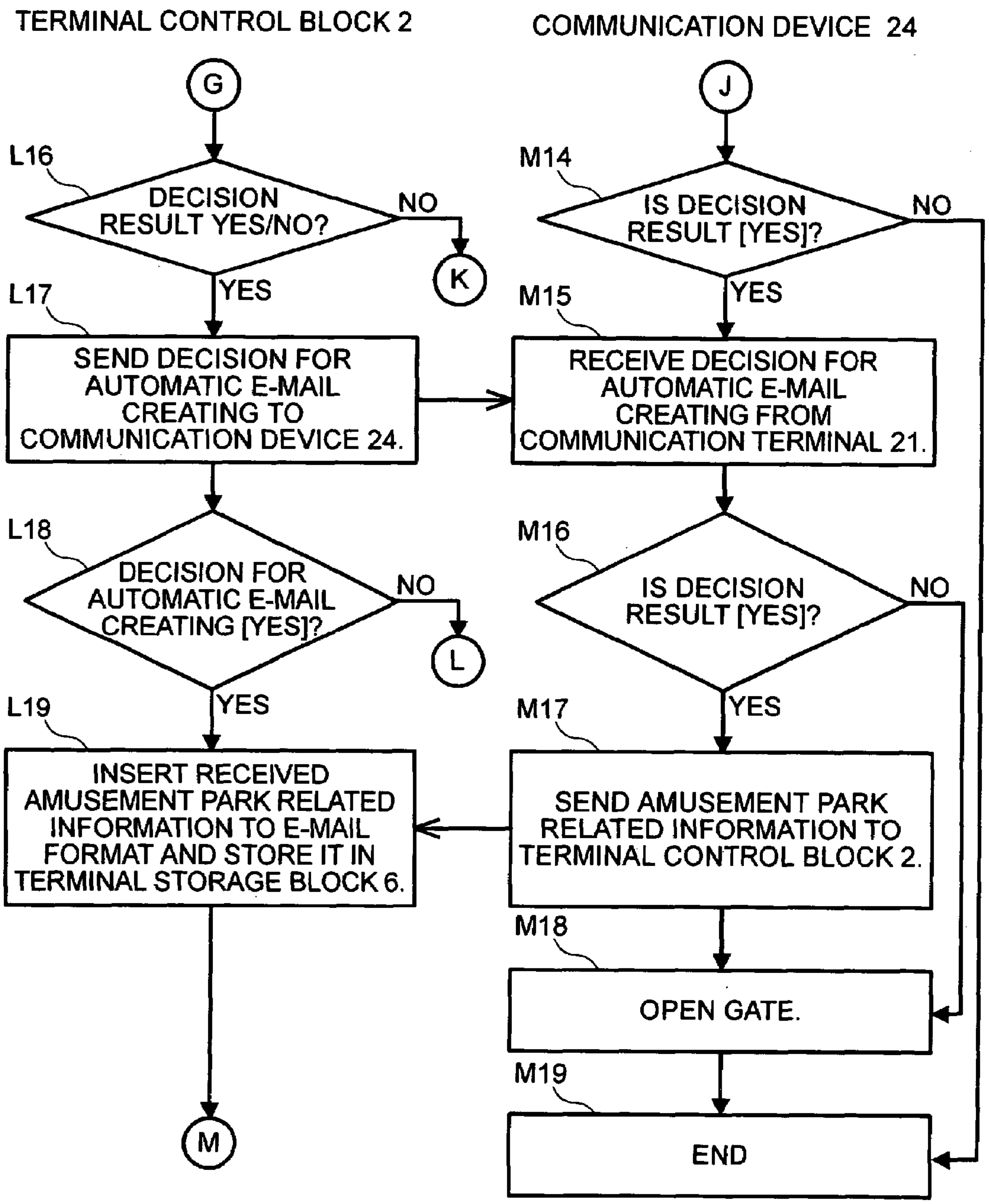
FIG. 14 is another chart for describing processing steps for sending an e-mail automatically at an amusement park.
Figure 15:
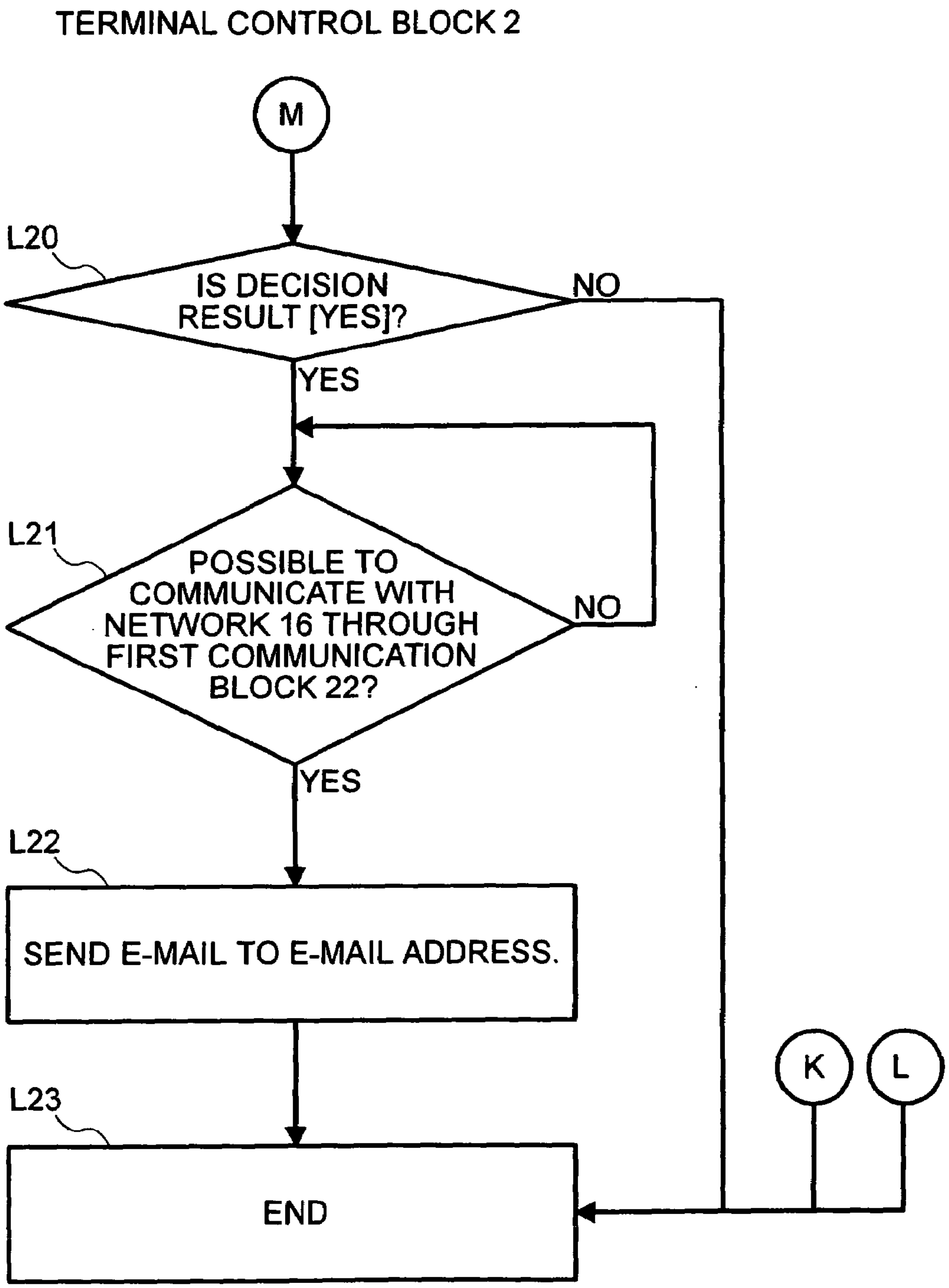
FIG. 15 is still another chart for describing processing steps for sending an e-mail automatically at an amusement park.

Hereunder, a description will be made for an embodiment of processes for enabling the user to enter an amusement park with reference to FIGS. 13 through 15.

In this connection, the user is requested first to store the e-mail format in which the text is to be edited, as well as the target mail address in the terminal storage 6 and set for creating and sending the e-mail automatically (step L11). When the user goes close to the entrance gate of the amusement park (step L12), the communication terminal 21 begins communicating with the communication device 24 attached to the entrance gate through the second communication unit 23 (step L13). The terminal control unit 2 then sends the admission ticket information required for the admission to the communication device 24 (step L14). The communication device 24, receiving the information, checks if the ticket is valid to decide whether to allow the user to pass the gate (step M12).

The communication device 24 then sends the decision result to the terminal control unit 2 (step M13 and L15). If the received decision result is, "Yes" (step L16-Yes), the terminal control unit 2 sends the decision for the e-mail automatic creation stored in the terminal storage 6 to the communication device 24 (steps L17 and M15).

The communication device 24, if the received decision for the automatic e-mail creation is "Yes" (step M16-Yes), sends the information related to the amusement park to the communication terminal 21 (step M17). The information related to the amusement park mentioned here means, for example, an admission time, the name, picture data, mascot character of the amusement park, well as the voice data of the original song of the amusement park. After sending the information related to the amusement park, the communication device 29 opens the gate (step M18) and terminates the series of the processes (step M19). If the decision for the automatic e-mail creation in step M16 is "No," the communication device 24 opens the gate (step M16-No) and terminates the processing (step M19).

If the decision for the automatic e-mail creation is "Yes" (step L18-Yes), the terminal control unit 2 of the communication terminal 21 inserts the received information related to the amusement park in the field of the corresponding control code in the e-mail format stored in the terminal storage 6 so as to create an e-mail and stores the mail in the terminal storage 6 (step L19).

Furthermore, if the decision for the automatic e-mail sending stored in the terminal storage 6 is "Yes" (step L20-Yes) and the communication with the network 16 through the first communication unit 22 is allowed (step L21-Yes), the terminal control unit 2 sends the created e-mail to the address stored in the terminal storage 6 (step L22), then terminates the series of the processes (step L23). On the other hand, if the communication with the network 16 through the first communication means is not allowed (step L21-No), the terminal control unit 2 waits until the communication is allowed, then goes to step L22.

If the decision of whether to pass the user is "No" (step L16-No), if the decision for the automatic mail creation is "No" (step L18-No), or if the decision for the automatic mail sending is "No" (step L20-No), the terminal control unit 2 terminates the series of the processes (step L23).

According to this embodiment, therefore, the user can transmit the atmosphere of the amusement park not only by a text message, but also by the picture of the mascot character and the original song of the amusement park. When the user receives mails from his/her friends about the atmosphere of the amusement part such way, the mail receiver (user) comes to have a favorable impression about the amusement park. This embodiment will thus be very effective in advertisement.

For example, if a control code that is not transferable is added to each e-mail so that the receiver cannot transfer the e-mail, the copyrights of the mascot character and the original song are protectable. In addition, if the amusement park contents are changed according to such various periodical conditions as the spring/summer/fall/winter season, Christmas, and the like, as well as special events such as "the 1,000th visitor" today while unexpected special contents are distributed to the terminals of the users, it will keep the user's interest in the amusement park effectively, thereby the added value of the amusement park will be improved.

It is also possible to enable each e-mail that includes the mascot character and the original song of the amusement park to be sent only when the user passes an entry/leaving gate and/or an attraction gate in the amusement park and add an e-mail sending inhibiting code to the e-mail format after the user leaves the amusement park. Because the e-mail sending inhibiting code can also be set so that e-mails that include specific characters cannot be sent from any place other than limited places such way, the amusement park value added is improved more.

While the e-mail format is stored beforehand in the terminal storage 6 in this embodiment, the format may also be sent to the communication terminal 21 from the communication device 24 together with pictures and voice files when, through the second communication unit 23, the communication terminal 21 begins communication with the communication device 24 for allowing the user to pass the gate.

Furthermore, this embodiment is not limited only to such amusement parks. It may apply to tollbooths of stations and toll roads in sightseeing places. When an electronic account settlement is done at a shop in a sightseeing place, the communication terminal may obtain an e-mail format that includes the picture of the sightseeing place to be included in the e-mail to be sent.

Figure 16:
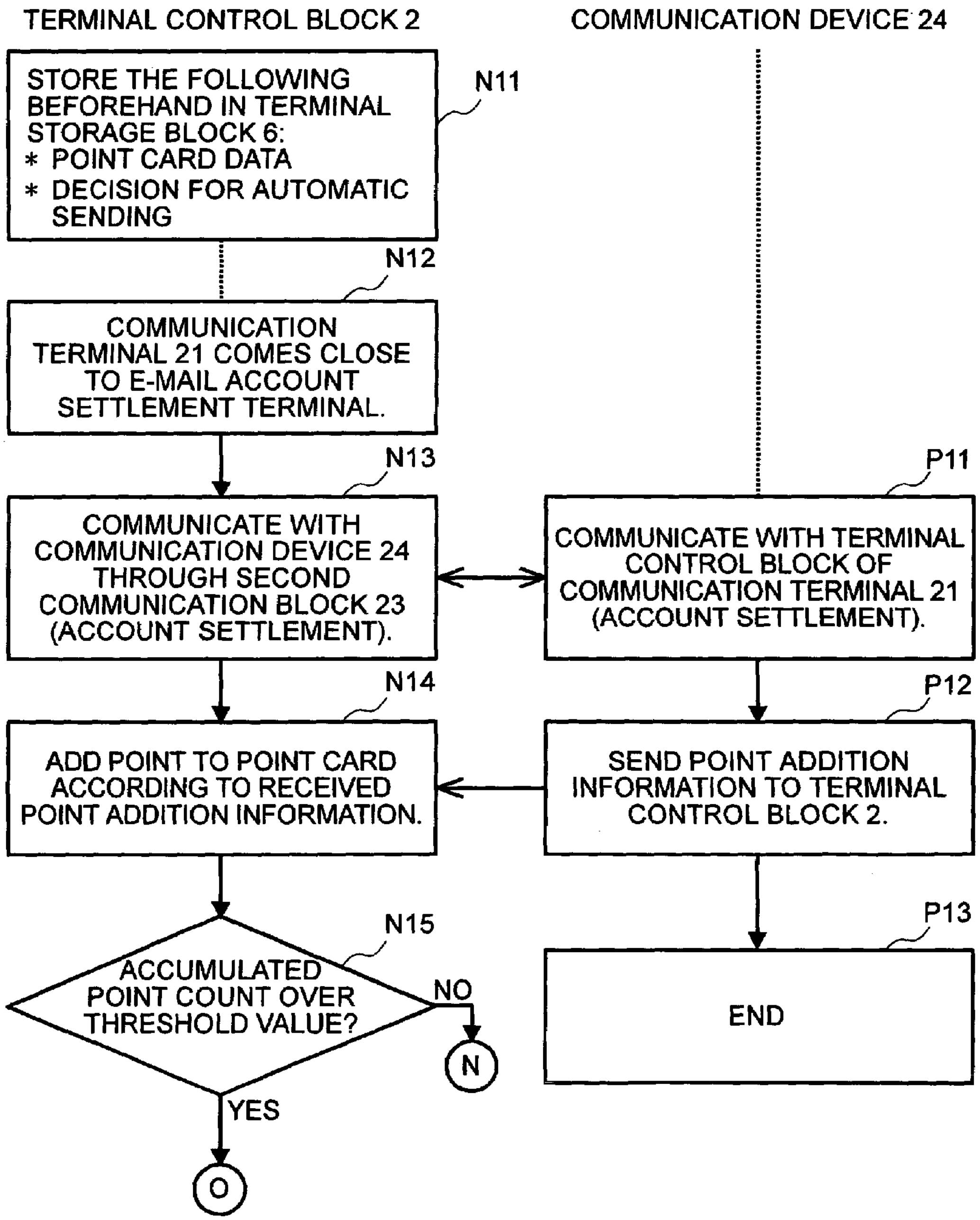
FIG. 16 is a chart for describing processing steps for making an application for a point card.
Figure 17:
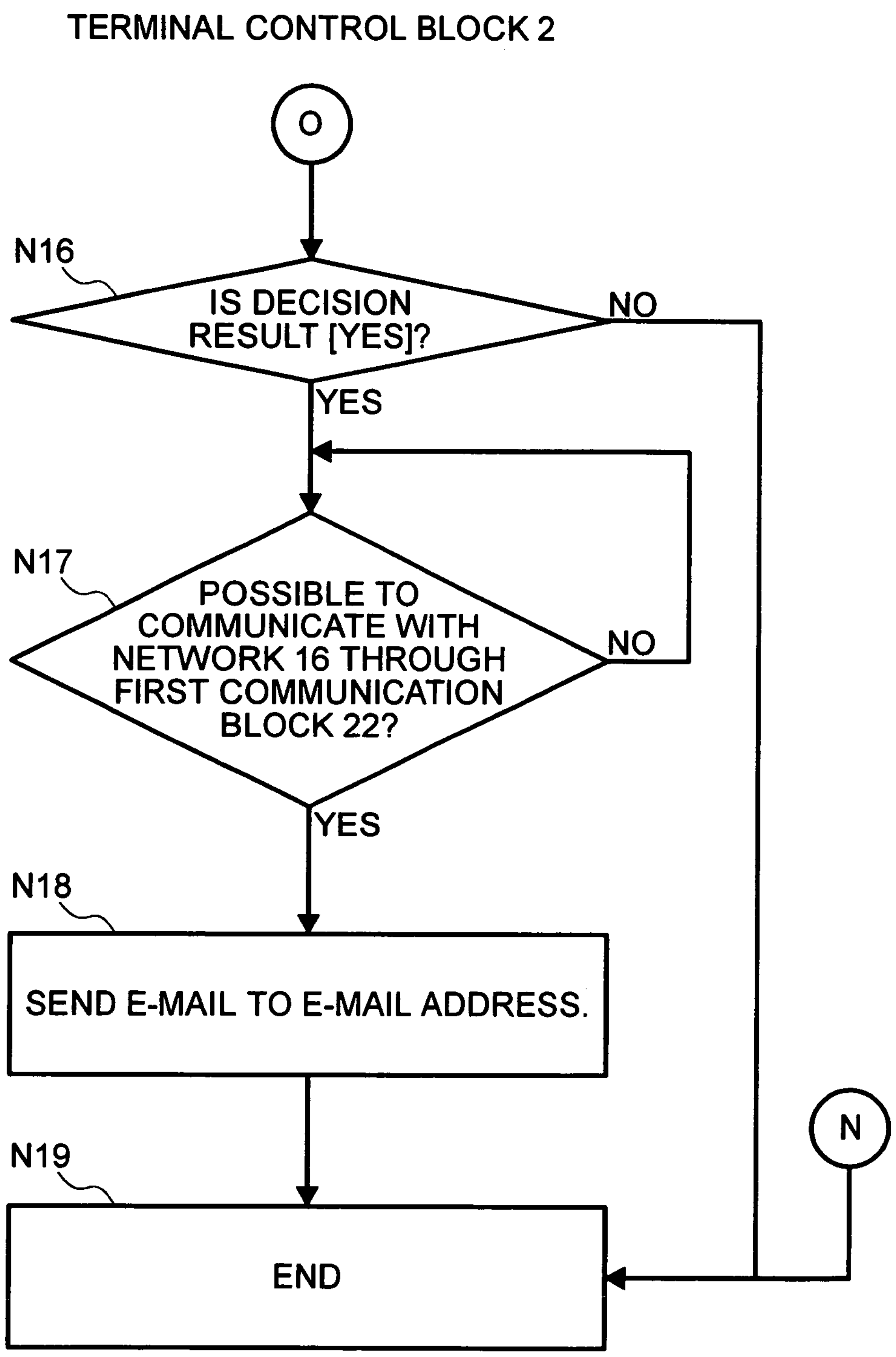
FIG. 17 is another chart for describing processing steps for making an application for a point card.

Next, a description will be made for an embodiment of a terminal for sending a point card used in an electronic account settlement from a communication terminal to its destination automatically with reference to FIG. 12 and FIGS. 16 and 17. In this embodiment, it is assumed that a point card is sent to company A automatically when the accumulated points reach a predetermined value in a system that uses the terminal. The system adds up points in the point card each time the user purchases a product, for example, of the company A. In this embodiment, an electronic account settlement method is employed so that a prepaid account is adjusted by reducing the balance of the account stored in the terminal storage. This method may be replaced with any other account settlement method, such as settlement by credit cards.

In this embodiment, the terminal storage 6 shown in FIG. 12 stores such data as the balance information of a prepaid sum. The communication device 24 is usually provided at electronic account settlement terminals installed in shops.

Each point card used in this system includes a sequence of data. It includes areas for storing accumulated points, a threshold value for denoting the number of accumulated points at which the user can receive a point card, and information for denoting the user's address to which the point card is to be sent. The point card may be stored in the terminal storage 6. The user may decide whether to send e-mails automatically with use of the input unit 4. The decision may be stored in the terminal storage 6.

Next, a description will be made with reference to FIGS. 16 and 17 for how points are added up at each settlement of the user's electronic account and for how a point card is to be set to the user automatically.

At this time, the user is required to download a point card, for example, from the home page of the company A beforehand and store it in the terminal storage 6 (step N11). When the user brings the communication terminal 21 close to the electronic account settlement terminal (step N12), the terminal control unit 2 of the communication terminal 21 communicates with the communication device through the second communication unit 23. Through this communication, the terminal control unit 2 reduces the payment from the balance of the prepaid sum stored in the terminal storage 6, thereby the payment is settled (step N13, P11).

At this time, if any product purchased by the user is an object of the point card of the company A, the communication device 24 sends point addition information to the communication terminal 22 according to the price of the purchased product through the second communication unit 23 (step P12), then terminates the processing (step P13).

The terminal control unit 2 then adds up the point in the point storage area of the point card stored in the terminal storage 6 according to the received point addition information (step N14). After that, the terminal control unit 2 refers to the number of points accumulated in the point storage area and the threshold value of the accumulated points. If the number of accumulated points is over the threshold value (step N15-Yes) and the decision for the automatic e-mail sending stored in the terminal storage 6 is "Yes" (step N16-Yes), and the communication with the network 16 through the first communication unit 22 is allowed, the terminal control unit 2 sends a point card to the point card sending address described in the point card (step N18), then terminates the series of operations (step N19).

On the other hand, if it is not allowed to communicate with the network 16 through the first communication unit 22 (step N11-No), the terminal control unit 2 waits until the communication is allowed, then goes to step N18. If the number of accumulated points is under the threshold value (step N15-No) and the decision for the automatic mail sending is "No" (step L16-No), the terminal control unit 2 terminates the series of processes (step N19).

According to this embodiment, therefore, the user is prevented from forgetting his/her request for a point card, since the request is done automatically when the number of accumulated points reaches the threshold value. It is also possible to display a message:

"Points are now ( ). Do you request for a point card? Yes/No"

so as to prompt the user to make confirmation for sending such a request e-mail. The user will thus be prevented from requesting a point card without his/her notice while the user still wants to accumulate points.

While a point card is downloaded beforehand through the first communication unit 22 and stored in the terminal storage 6 in this embodiment, it is also possible to obtain the point card through the first communication unit 22 or second communication unit 23 when the terminal control unit 2 receives point addition information from the communication device 24. According to this method, the user can obtain a point card even at a shop the user visits for the first time, so that the user's convenience is more improved. In addition, when the second communication unit 23 can use any of the infrared ray communication and the Bluetooth communication, the user can download a point card without charge.

In this embodiment, the user may input mail destinations by key operations. The user may also obtain a mail address to which the user is to send a point card request, together with a point card so that the request is registered automatically in the mail destination. Consequently, the user can save his/her labor for inputting the destination address.

This embodiment is not limited only to electronic account settlements. For example, it may apply to the point request, for example, at each admission to an amusement park according to the number of admission times.

According to the present invention as described above, it is possible to provide a communication terminal easy to operate and an information communication system that uses this communication terminal.

What is claimed is:

1. A communication terminal, comprising:

a first communication unit configured to transmit and receive data through a network;

a second communication unit configured to communicate with a communication device to receive data identifying an installation location of the communication device;

a storage device configured to store transmission location information denoting a transmission location where the first communication unit transmits information, and destination information for denoting a destination, corresponding to the transmission location, to which the information transmitted from the first communication unit is to be sent; and a controller configured to control the first communication unit so as to transmit information to the destination when the installation location information included in the data transmitted from the communication device corresponds to the transmission location information stored by the storage device, wherein the information transmitted from the first communication unit includes at least part of the data received from the communication device.

2. The communication terminal according to claim 1, wherein information to be sent through the first communication unit is an e-mail.

3. The communication terminal according to claim 1, wherein the communication device is an automatic ticket examination machine, the installation location information is information for denoting a station where the communication device is installed.

4. The communication terminal according to claim 3, wherein the data includes a name of the station or a time on which the communication terminal passes the station.

5. The communication terminal according to claim 3, wherein information to be sent through the first communication unit is an e-mail.

6. The communication terminal according to claim 1, wherein the installation location is a station, a shop, an amusement park or a tollbooth.

7. The communication terminal according to claim 6, wherein information to be sent through the first communication unit is an e-mail.

8. An information communication system, comprising:

a communication device configured to communicate with a communication terminal, wherein the communication terminal includes a first communication unit configured to communicate with an object through a network, a second communication unit configured to receive data from the communication device, and a storage device for storing communication device information related to the communication device and destination information for denoting a destination of an e-mail so that both communication device information and destination information correspond to each other, wherein responsive to a communication between the communication device and the second communication unit, the communication terminal creates an e-mail that includes at least part of data received from the communication device and sends the e-mail to an object through the first communication unit.

9. The information communication system according to claim 8, wherein the communication device is an automatic ticket examination machine, the installation location information is information for denoting a station where the communication device is installed.

10. The information communication system according to claim 9, wherein the data includes a name of the station or a time on which the communication terminal passes the station.

* * * * *